Patented Oct. 27, 1942

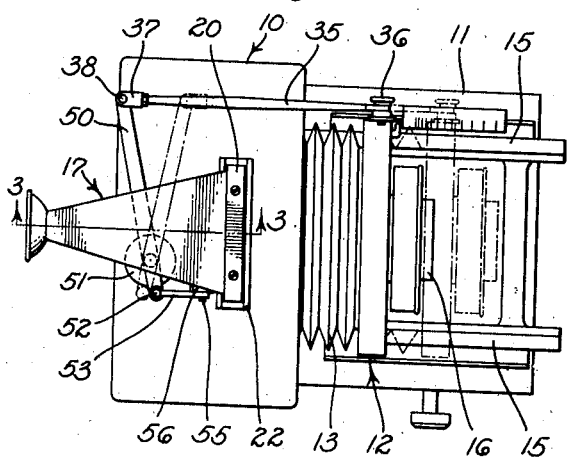
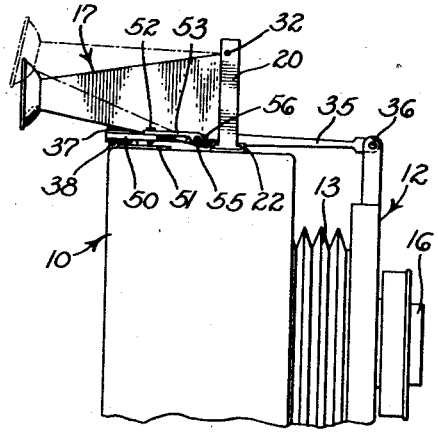
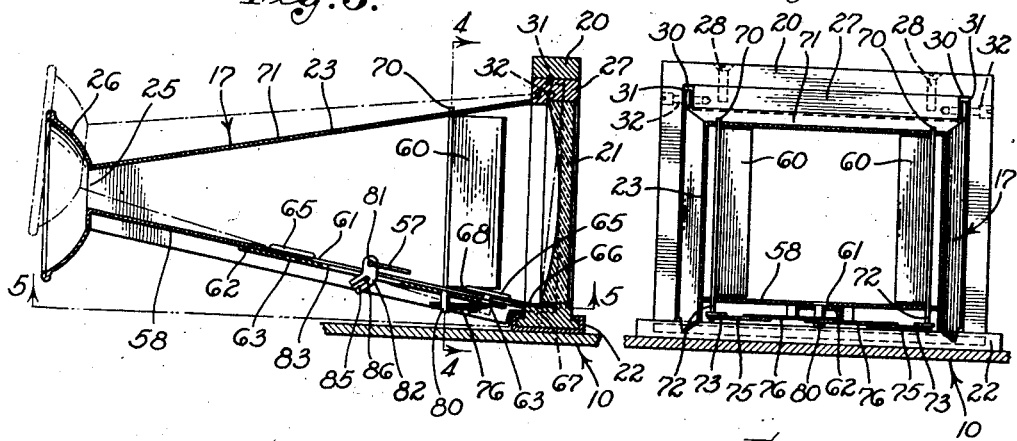
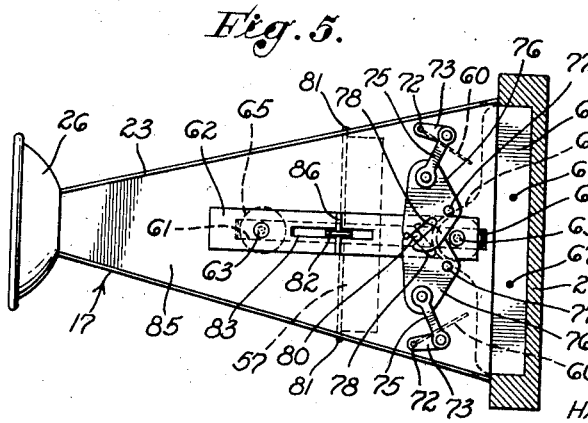
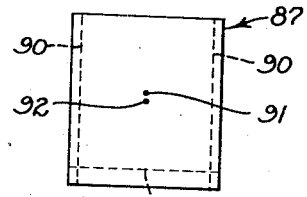

2,300,245

UNITED STATES PATENT OFFICE 2,300,245

CAMERA CONSTRUCTION

Burgess H. Bell, deceased, late of Hollywood, Calif., by Gwen Wakeling Bell, administratrix, Hollywood, Calif.

Application November 29, 1940, Serial No. 367,806

6 Claims. (Cl. 95—44)

This invention relates to cameras and is specifically directed to a view-finder means incorporated in a camera construction.

A typical camera has a main lens that projects an image of a scene on film in the camera and has an auxiliary view-finder providing an image to enable the operator to aim the camera and to compose the picture. In the usual camera construction there is a substantial discrepancy between the two images that increases seriously at close range focusing. The discrepancy is ignored by most manufacturers because it is not easily avoided, the result being that amateurs spoil many pictures. Careful photographers, however, try to estimate the discrepancy and desire better guidance on the part of a camera view-finder. The general object of the present invention is to provide such guidance by reducing to insignificance the discrepancy between the view-finder image and the image projected by the camera lens. The degree to which the discrepancy is resolved by the application of the principles employed herein will vary in different practices of the invention from moderate correction in some instances to substantially perfect correspondence between the view-finder image and the camera image in other instances.

One cause of the usual discrepancy between the two images arises from the fact that the view-finder lens is fixed relative to the camera and is necessarily displaced or offset from the camera lens. In conventional camera constructions the view-finder is fixed relative to the camera. If the axis of the view-finder is fixed parallel to the focal axis of the camera, the field of the view-finder will always be offset from the field projected by the camera lens, the discrepancy being excessive at relatively close ranges. If the axis of the fixed view-finder is inclined relative to the focal axis of the camera to cause the view-finder axis and the focal axis of the camera to converge at a selected distance from the camera, coincidence of the two images will be achieved at the selected distance but there will be increasing discrepancies at greater and lesser distances. One object of the present invention is to eliminate this particular discrepancy factor by incorporating an automatically controlled variably-directed view-finder in a camera construction.

Another factor for consideration in seeking accurate correspondence between the view-finder image and the camera image is that as the spacing of the camera lens from the camera film is decreased for focusing on objects at close range, the scope of the field projected on the film is curtailed. To compensate for this second factor, it becomes necessary to cause the scope of field perceived through the view-finder to be curtailed proportionately. A further object of the invention is to provide for varying the scope of the view-finder field in accordance with variations in the scope of the camera field.

The above and other objects of the invention will be apparent in the following detailed description, taken with the accompanying drawing. For the purpose of disclosure and to illustrate the principles involved a particular bellows-type camera has been chosen for description in the knowledge that those skilled in the art will find adequate guidance therein for incorporating the invention in other types of cameras.

In the drawing which is to be considered as illustrative only:

Fig. 1 is a plan view of a camera incorporating the invention;

Fig. 2 is a fragmentary side elevation of the camera;

Fig. 3 is an enlarged section through the view-finder taken as indicated by the line 3—3 of Fig. 1;

Fig. 4 is a transverse section taken on the line 4—4 of Fig. 3;

Fig. 5 is a bottom view of the view-finder partly in section taken as indicated by the line 5—5 of Fig. 3; and Fig. 6 is a diagram representing the operation of the view-finder in one practice of the invention.

The camera shown in the drawing includes a rear housing or main section, generally designated 10, a front panel or camera bed 11, a front section, generally designated 12, that is movable relative to the main section 10, a bellows 13 interconnecting the front section and the main section, and tracks 15 on the panel 11 on which the front section 12 is adapted to slide forward and rearward relative to the main section 10. The usual camera lens 16 on the movable front section 12 is adapted to project an image on the film in the camera, and a view-finder, generally designated 17, mounted on the top of the main camera section 10 is adapted to present to the operator an image that at least approximates the image projected by the camera lens 16.

The view-finder 17 is mounted on the top of the camera section 10 in any suitable manner that permits the view-finder to be variably tilted relative to the focal axis of the camera. In the particular construction suggested by the drawing a rectangular frame 20, in which is mounted a rectangular finder lens 21, is fixedly mounted on the top of the camera section 10, the frame, for example, being held by a metal channel member 22 on the top of the camera. Extending rearward from the frame 20 is a tapered sheet metal body 23 of rectangular cross-sectional configuration that terminates in a rear opening 25 surrounded by a cup-shaped eye-piece 26.

In the present form of the invention it is contemplated that the sheet metal body 23 will be pivotally mounted on the rectangular frame 20 to rotate about an axis toward the upper end of the frame. To this end a cross-piece 27 attached to the frame by suitable screws 28 forms with the frame two recesses 30 in the upper corners of the frame and the sheet metal body 23 is provided with ears 31 that extend upwardly into the recesses. The two ears 31 are engaged by pivot members in the form of screws 32. The forward end of the sheet metal body 23 is dimensioned to telescope into the frame, as indicated in Fig. 3, and the extent to which the sheet metal body extends into the frame is sufficient to prevent any substantial admission of light around the forward edge of the sheet metal body within the operating range of movement of the body.

To cause the sheet metal body 23 of the view-finder 17 to tilt upward as the front section 12 of the camera is extended forward for close range focusing, any suitable mechanism may be provided. In the particular construction shown, a link 35 loosely pivoted to the front camera section 12 by a suitable pivot screw 36 is formed as a clevis 37 at its rearward end. A pivot pin 38 extending through the clevis 37 connects the link 35 with one arm of a lever 50 that is pivotally mounted on a circular base plate 51 on the top of the camera section 10. The other arm of the lever 50 is connected by a pivot pin 52 to a relatively short link 53 that swings about a pivot stud 55, the pivot stud being mounted on a small body 56 projecting laterally from the view-finder body 23 well below the rotational axis of the view-finder body.

It is apparent that forward movement of the front section relative to the main camera section 10 will cause the lever 50 to rotate clockwise, as viewed in Fig. 1, and thereby move the short link 53 rearward to swing the view-finder body 23 upward about the axis of the two screws 32 in the rectangular frame 20. By virtue of the described interconnecting mechanism the tilting of the view-finder body will be at least approximately proportional to the relative forward movement of the camera lens and therefore inversely proportional to the distance from the camera of the object on which the camera is focused. It is contemplated that the arrangement will cause the longitudinal axis of the view-finder body 23 and the focal axis of the lens 16 to converge at whatever distance the operator focuses the camera. The described arrangement, therefore, removes the first cause heretofore mentioned for the usual discrepancy between the image seen in the view-finder and the image projected on the film in the camera.

The invention is further characterized by the concept that the second cause heretofore mentioned for the usual discrepancy between the two images may be met by automatic masking means for varying the dimensions of the view-finder image in inverse proportion to changes in the distance between the camera lens on the movable front section 12 and the focal plane in the main camera section 10. Such variable masking means may comprise a movable mask means in the form of an opaque blade 57 disposed horizontally across the bottom wall 58 of the sheet metal body 23 and a similar blade 60 disposed vertically at each side of the sheet metal body.

While any suitable mechanism may be employed to operate the bottom mask 57 and the two side masks 60 in response to relative movement of the front camera section 12, it has been found convenient to employ mechanism responsive to the rotation of the view-finder body 17 relative to the fixed rectangular frame 20 or relative to the main camera section 10. In the particular construction shown in the drawing the bottom wall 58 of the view-finder body 23 has a longitudinal slot 61 under which is placed a longitudinal slide bar 62. The slide bar 62 is fixed relative to the rectangular frame 20 and therefore moves relative to the bottom wall 58 when the body 23 swing about its rotational axis. The slide bar is supported by a pair of spaced rivets 63 that extend through the slot 61 and are in turn supported by slide discs 65 resting on the bottom wall 58. The slide bar 62 is flexibly connected with the rectangular frame 20 in any suitable manner. For example, as best shown in Figs. 3 and 5, a relatively flexible strip of sheet metal 66 attached to the bottom of the rectangular frame 20 by small screws 67 has a rearwardly extending tongue 68 that extends under the rear slide disc 65 into engagement with the rear rivet 63.

Each of the two side masks 60, as best shown in Fig. 4, has an upper trunnion 70 journaled in a suitable aperture in the upper wall 71 of the sheet metal body 23 and has a lower trunnion 72 likewise journaled in a suitable aperture in the bottom wall 58, the lower trunnion carrying a small radial arm 73. Each of the radial arms 73 is connected by a link 75 to a small cam plate 76 that is rotatably mounted on a suitable pivot stud 77. The two cam plates 76 overlap under the slide bar 62 and have intersecting diagonal slots 78 that engage a downwardly extending pin 80. Since the cam pin 80 is carried by the slide bar 62 and the two cam plates 76 are mounted on the bottom wall 58, relative movement between the slide bar and the bottom wall, incidental to rotation of the sheet metal body 23, causes rotation of the two cam plates 76 and therefore actuates the two side masks 60. The arrangement is such that upward tilting of the sheet metal body 23 for short range focusing causes the two masked blades to swing inward to restrict the field of vision in the view-finder.

The bottom mask 57 is pivotally mounted by trunnions 81 that are journaled in the side walls of the body 23 and is controlled by a small arm 82 that extends downward through the previously mentioned slot 61 in the bottom wall 58 and also through a second slot 83 that is cut longitudinally in the slide bar 62. As best shown in Fig. 3, the small arm 82 has an inclined slot 85 in its lower end that engages a small cross pin 86, the cross pin extending across the slide bar slot 83 and being fixedly attached to the underside of the slide bar. When the view-finder body 23 is tilted upward, it moves rearward relative to the slide bar 62 and the engagement of the small arm 82 with the cross pin 86 on the slide bar causes the bottom mask 57 to swing upward and thereby restrict the field of vision from below.

In the practice of the above described form of the invention the bottom mask 57 and the two side masks 60 are relied upon to restrict the field of vision and thereby reduce the scope of the view-finder image. The manner in which the bottom mask 57 and the two side masks 60 serve to restrict the field of vision of the view-finder in accord with restriction of the camera field with forward extension of the camera for short range focusing may be understood from Fig. 6. The outer full-line rectangle 87 represents the maximum view-finder field as it appears to the operator when the camera is focused at infinity. If the camera is extended to focus on a relatively close object and if accuracy would require 10% reduction both in height and width of the view-finder field, the bottom mask 57 would rise to the dotted line position 88 cutting off the lower 10% of the rectangle 87 and the two side masks 60 would swing inward to the dotted line positions 90 to cut off 5% of the rectangle 87 along each side margin of the rectangle. It will be noted that the bottom mask is spaced rearward of the two side masks and therefore has an accentuated masking effect.

The fact that the center 91 of the resultant restricted field is above the center 92 of the maximum field represented by the rectangle 87 may be ignored if something less than full correction is satisfactory but preferably is taken into consideration in designing the mechanism for tilting the view-finder. Full correction in the latter case is achieved by considering the axis of the view-finder as shifted to the center 91 and so tilting the view-finder that the new axis represented by the center 91, rather than the original axis represented by the center 92, intersects the focal axis of the camera at the focal distance to which the camera is adjusted. In practice, the full correction is achieved simply by arranging for movement of the view-finder to keep the top of the view-finder field coincident with the top of the field projected on the camera film.

The operation of the automatic view-finder may be readily understood from the above discussion. It is apparent that the view-finder body 23 will swing automatically about its horizontal axis of rotation to substantially center on any object on which the camera is centered and focused, and that the field of vision of the view-finder will vary in scope with the projected field in the camera so that the view-finder image will closely approach accurate correspondence with the image projected on the camera film.

The detailed description of a specific embodiment of the invention will suggest to those skilled in the art various changes, modifications, and substitutions that do not depart from the underlying inventive concept, and the right is reserved to all such variations of the invention that come within the scope of the appended claims.

What is claimed is:

1. The combination with an extensible focusing camera having an offset view-finder of means to vary the view-finder image according to changes in the camera image resulting from changes in the camera focus, said means comprising: means responsive to extension and contraction of the camera to incline said view-finder relative to the camera to cause the axis of the view-finder field to converge on the focal axis of the camera at substantially the distance from the camera at which the camera is focused; masking means mounted on the view-finder and movable relative thereto toward and away from the view-finder axis to vary the area of the view-finder field; and actuating means anchored to the camera proper and extending from the camera to the view-finder to derive actuating energy from movement of the view-finder relative to the camera, said actuating means being operatively connected to said masking means to move the masking means in accord with the movement of the view-finder relative to the camera.

2. The combination with an extensible focusing camera having an offset view-finder of means to vary the view-finder image according to changes in the camera image resulting from changes in the camera focus, said means comprising: means responsive to extension and contraction of the camera to incline said view-finder relative to the camera to cause the axis of the view-finder field to converge on the focal axis of the camera at substantially the distance from the camera at which the camera is focused; a first masking means mounted on said view-finder and movable relative thereto toward and away from the view-finder axis to vary the width of the view-finder field; a second masking means mounted on said view-finder and movable relative thereto toward and away from the view-finder axis to vary the vertical dimension of the view-finder field; actuating means anchored to the camera and movably connected with the view-finder; means operatively connecting said first masking means with said actuating means, whereby said first masking means varies the width of the view-finder field in response to movement of inclination of the view-finder; and means operatively connecting said second masking means with said actuating means, whereby said second masking means varies the vertical dimension of the view-finder field in response to movement of inclination of the view-finder.

3. The combination with an extensible focusing camera having an offset view-finder of means to vary the view-finder image according to changes in the camera image resulting from changes in the camera focus, said means comprising: means responsive to extension and contraction of the camera to incline said view-finder relative to the camera to cause the axis of the view-finder field to converge on the focal axis of the camera at substantially the distance from the camera at which the camera is focused; a first masking means mounted on said view-finder and movable relative thereto toward and away from the view-finder axis to vary the width of the view-finder field; a second masking means mounted on said view-finder and movable relative thereto toward and away from the view-finder axis to vary the vertical dimension of the view-finder field; actuating means anchored to the camera proper and extending from the camera to the view-finder to derive actuating energy from movement of the view-finder relative to the camera; means operatively connecting said actuating means with said first masking means to operate the first masking means to vary the width of the view-finder field at a given rate in response to inclination movement of the view-finder; and means operatively connecting said actuating means with said second masking means to move the second masking means to vary the vertical dimension of the view-finder field at a different given rate to vary the height of the view-finder field in response to inclination movement of the view-finder, said two rates being in proportion to the width and height of the view-finder field respectively.

4. The combination with an extensible focusing camera having an offset view-finder of means to vary the view-finder image according to changes in the camera image resulting from changes in the camera focus, said means comprising: means responsive to extension and contraction of the camera to incline said view-finder relative to the camera to cause the axis of the view-finder field to converge on the focal axis of the camera at substantially the distance from the camera at which the camera is focused; masking means movably mounted on the view-finder to vary the area of the view-finder field; means slidingly mounted on the view-finder and operatively connected to said masking means; and means connecting said sliding means with the camera to cause movement of the sliding means relative to the view-finder in response to movement of the finder.

5. The combination with an extensible focusing camera having an offset view-finder of means to vary the view-finder image according to changes in the camera image resulting from changes in the camera focus, said means comprising: means to rotate the view-finder relative to the camera about an axis of rotation to cause the axis of the view-finder field to converge on the focal axis of the camera at substantially the distance from the camera at which the camera is focused; masking means mounted on the view finder and movable relative thereto toward and away from the view-finder axis to vary the area of the view-finder field; an actuating means mounted on the view-finder for movement relative thereto, said actuating means being operatively connected to said masking means; and means linking said actuating means with said camera at a point fixed relative to the camera spaced from said axis of rotation, thereby to cause the actuating means to move relative to the view-finder in response to rotation of the view-finder about said axis of rotation.

6. A combination as set forth in claim 2 in which said second masking means comprises a single masking element effective along only one of the two horizontal margins of the view-finder field whereby the center or axis of the view-finder field shifts up and down with operation of the single masking element and in which the means to rotate the view-finder acts about a normally horizontal axis and is effective to tilt the view-finder not only in accordance with changes in the distance at which the camera is focused but also in accordance with said vertical shift in the center or axis of the view-finder field.

GWEN WAKELING BELL.
*Administratrix of the Estate of Burgess H. Bell, Deceased.*